(No Model.)
H. T. JOHNSON.
GALVANIC BATTERY.
No. 483,654. Patented Oct. 4, 1892.
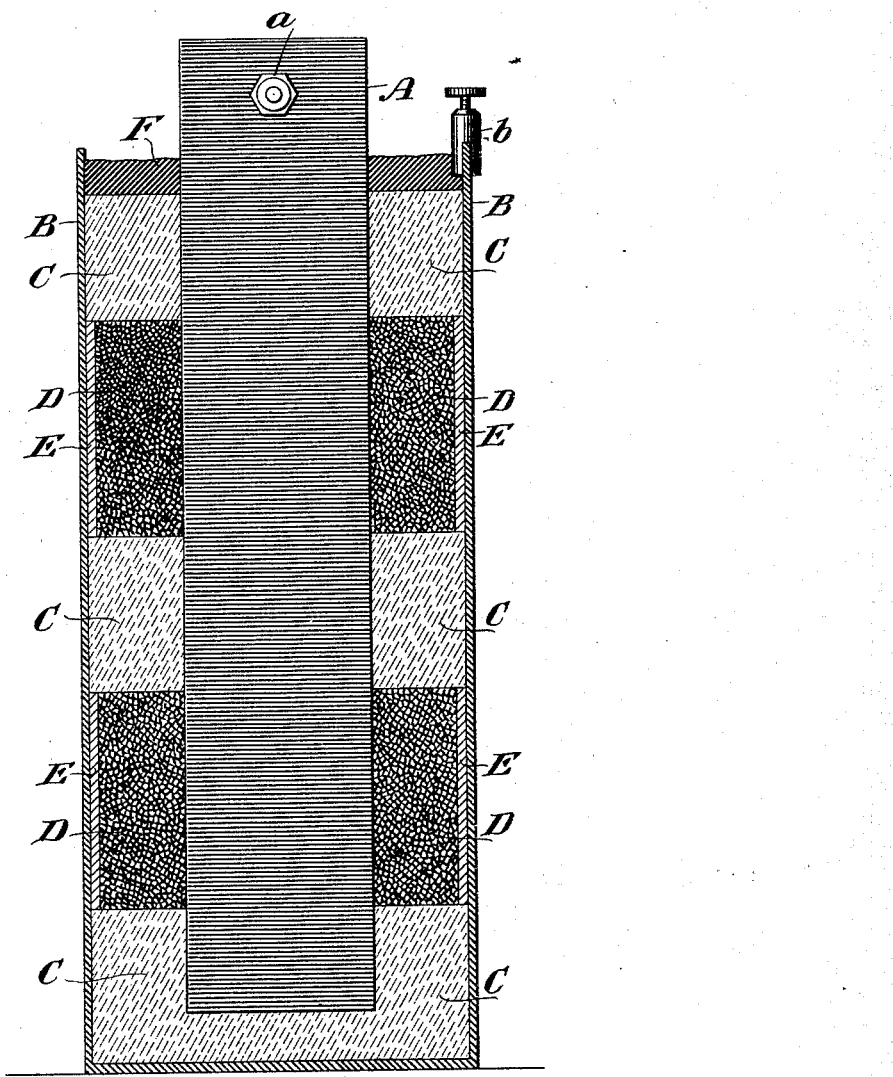
Witnesses
C. E. Ashley
S. F. Macpeak
Inventor
Harry T. Johnson
By his Attorneys
Murphey & Metcalf

UNITED STATES PATENT OFFICE.

HARRY T. JOHNSON, OF NEW YORK, N. Y.

GALVANIC BATTERY.

SPECIFICATION forming part of Letters Patent No. 483,654, dated October 4, 1892.

Application filed December 10, 1891. Serial No. 414,542. (No model.)

*To all whom it may concern:*

Be it known that I, HARRY T. JOHNSON, of the city, county, and State of New York, have invented a certain new and useful Improvement in Galvanic Batteries, of which the following is a full, clear, and exact description, reference being had to the accompanying drawing, forming part of this specification.

My invention relates to that particular description of galvanic batteries commonly known as "dry batteries." Batteries of this character, by reason of the fact that they contain no free liquids, are exceedingly convenient and better adapted for many purposes than the more-cumbersome and less-cleanly liquid batteries. With dry batteries as usually constructed, however, two defects exist to a greater or less degree—namely, a high internal resistance and an unequal distribution of moisture throughout the exciting compound, whereby the efficiency and power of the battery are greatly deteriorated.

The object of my invention is to remedy these defects by so arranging the compounds used in the battery with relation to the electrodes as to reduce the internal resistance and secure a more even distribution of moisture throughout said compounds; and to this end it consists in the novel arrangement and distribution of the exciting and depolarizing substances used in the battery with relation to the electrodes thereof, hereinafter described, and specifically pointed out in the claims.

The accompanying drawing represents a sectional elevation of my improved battery.

In said drawing, A represents the negative electrode of the battery, formed, preferably, of carbon and provided with a binding-screw $a$, by which the terminal of an electrical conductor is secured to the electrode. The positive electrode B is a cup-shaped vessel, preferably of zinc, which is also provided with a binding post or screw $b$ for the connection of the terminal of an electrical conductor. The exciting agent C is arranged in independent horizontally-disposed strata within the cup, so as to surround the negative electrode and preferably to contact with both electrodes. The depolarizing agent D, which may consist of peroxide of manganese, is preferably mixed with crushed carbon, gas, coke, or other equivalent substance, and the mixture so formed is arranged in strata alternately with those of the exciting agent. In order to prevent local action in the battery which might arise should any of the carbon or other substance mixed with the depolarizer contact with the positive electrode, I interpose between said electrode and the strata which contain the depolarizer the separators E, which prevent actual contact of the carbon or other particles with the electrode. The separators E may be formed of any suitable non-metallic substance, preferably a porous substance, such as felt or baked clay.

Any suitable excitant and depolarizer may be used. Those which I have used and which give good results are as follows: For the exciting agent, sal ammoniac, two parts; plaster, three parts; flour, two parts; water, three parts. For the depolarizing agent, peroxide of manganese. This I usually mix with crushed carbon in the proportion of four parts of the manganese to five parts of carbon; but these substances and proportions may be varied if desired, and I use the terms "depolarizer" and "depolarizing agent" herein and in the claims to denote any suitable substance which will act as a depolarizer, either when used alone or mixed with carbon or other equivalent substance.

In the construction of my improved battery I proceed as follows: I place the negative electrode centrally within the cup-shaped positive electrode and in such a position that it shall not reach entirely to the bottom of the cup. I then pour a sufficient quantity of the exciting agent C, which when first mixed is in a fluid state, into the cup to fill the space between the bottoms of the two electrodes and to extend part way up the negative electrode. I then insert one of the separators E within the positive electrode and fill the space between the separator and the negative electrode with the depolarizing agent D (which may consist of peroxide of manganese or a mixture of the same and crushed carbon, as described) and tamp the same firmly around the said electrode. I then pour in another stratum of the exciting agent, then insert, as before, another separator and another stratum of the depolarizing agent, and then pour in another stratum of the exciting agent. I then, when it is desired to produce a hermetically-sealed battery, fill the cup to the top with melted wax or asphaltum, which will harden and prevent the too-rapid evaporation of the moisture within the battery.

I have found that the arrangement of the exciting agent in three strata, as herein shown and described, produces an exceedingly-efficient battery, and such arrangement is perhaps as desirable as any; but I do not intend to limit my invention to that precise number, which may be varied at will without departing from the spirit of my invention.

Having thus described my invention, what I claim as new, and desire to secure by Letters Patent, is—

1. A galvanic battery of the character described, having the exciting agent and the depolarizing agent arranged alternately in horizontally-disposed strata within the cup-shaped positive electrode, substantially as herein shown and described.

2. A galvanic battery of the character described, having the exciting agent arranged in horizontally-disposed strata contacting with both electrodes, and the depolarizing agent, also arranged in horizontal strata alternately with those of the exciting agent, and separators for preventing the conducting substance mixed with the depolarizing substance from contacting with the positive electrode, substantially as shown and described.

3. In a galvanic battery of the character described, the combination, with the positive and negative electrodes, of an exciting agent arranged in horizontally-disposed strata and contacting with both electrodes, the depolarizing agent, also arranged in horizontally-disposed strata between the strata of exciting agent, and the separators E, interposed between the positive electrode and the depolarizing agent, substantially as shown and described.

4. In a galvanic battery of the character described, the combination, with the positive and negative electrodes, of an exciting agent arranged in horizontally-disposed strata and contacting with both electrodes, the depolarizing agent also arranged in horizontally-disposed strata between the strata of exciting agent, the separators E, interposed between the positive electrode and the depolarizing agent, and the seal closing the top of the positive electrode, substantially as shown and described.

HARRY T. JOHNSON.

Witnesses:
S. G. METCALF,
W. W. SHAW.